(12) United States Patent
Antonatos et al.

(10) Patent No.: US 11,562,087 B2
(45) Date of Patent: Jan. 24, 2023

(54) SENSITIVE DATA POLICY RECOMMENDATION BASED ON COMPLIANCE OBLIGATIONS OF A DATA SOURCE

(71) Applicant: International Business Machines Corporation, Armonk, NY (US)

(72) Inventors: Spyridon Antonatos, Dublin (IE); Stefano Braghin, Dublin (IE); Naoise Holohan, Dublin (IE); Killian Levacher, Dublin (IE); Rahul Nair, Dublin (IE); Martin Stephenson, Ballynacargy (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 986 days.

(21) Appl. No.: 16/353,540

(22) Filed: Mar. 14, 2019

(65) Prior Publication Data
US 2020/0293675 A1      Sep. 17, 2020

(51) Int. Cl.
*G06F 21/00*      (2013.01)
*G06F 21/62*      (2013.01)
*G06N 5/04*       (2006.01)

(52) U.S. Cl.
CPC ........... *G06F 21/6218* (2013.01); *G06N 5/04* (2013.01); *G06N 5/045* (2013.01); *G06N 5/046* (2013.01)

(58) Field of Classification Search
CPC ... G06F 21/6218; G06F 21/6245; G06N 5/04; G06N 5/045; G06N 5/046; G06N 7/005;
(Continued)

(56) References Cited

U.S. PATENT DOCUMENTS 6,993,448 B2    1/2006  Tracy et al.
7,937,319 B2 *  5/2011  Kennis ............... G06Q 30/018
                                                705/37
(Continued)

OTHER PUBLICATIONS

Slankas, et al., "Access Control Policy Extraction from Unconstrained Natural Language Text," SocialCom/PASSAT/BigData/EconCom/BioMedCom (2013), 6 pages.
(Continued)

*Primary Examiner* — Don G Zhao
(74) *Attorney, Agent, or Firm* — Amin, Turocy & Watson, LLP

(57) ABSTRACT

Systems, computer-implemented methods, and computer program products that can facilitate sensitive data policy recommendation are provided. According to an embodiment, a system can comprise a memory that stores computer executable components and a processor that executes the computer executable components stored in the memory. The computer executable components can comprise an extraction component that can employ an artificial intelligence model to extract compliance data from a data source. The computer executable components can further comprise a recommendation component that can recommend a sensitive data policy based on the compliance data. In some embodiments, the recommendation component can further identify one or more sensitive data entities of a sensitive data dataset that are affected by actionable obligation data of the data source.

20 Claims, 10 Drawing Sheets

(58) Field of Classification Search
CPC ...... G06N 3/0445; G06N 5/003; G06N 20/20; H04L 63/205
See application file for complete search history.

(56) References Cited

U.S. PATENT DOCUMENTS

| | | | |
|---|---|---|---|
| 9,123,024 | B2 | 9/2015 | LeVine et al. |
| 10,540,493 | B1* | 1/2020 | Kras ................. G09B 5/00 |
| 2004/0107124 | A1 | 6/2004 | Sharpe et al. |
| 2007/0061156 | A1 | 3/2007 | Fry et al. |
| 2008/0162377 | A1* | 7/2008 | Pinkas ............... G06Q 40/04 705/36 R |
| 2008/0168135 | A1* | 7/2008 | Redlich .............. G06F 16/282 709/204 |
| 2013/0085958 | A1 | 4/2013 | Beck et al. |
| 2015/0074746 | A1* | 3/2015 | Kohno ............. G06F 21/6245 726/1 |
| 2016/0065621 | A1* | 3/2016 | Bradley ........... H04L 63/1441 726/1 |
| 2016/0196516 | A1* | 7/2016 | Anisingaraju ..... G06Q 10/0635 705/7.28 |
| 2017/0034023 | A1* | 2/2017 | Nickolov ........... H04L 43/0817 |
| 2018/0039946 | A1* | 2/2018 | Bolte ................ G06Q 50/2057 |
| 2019/0394238 | A1* | 12/2019 | Putz .................... H04L 63/20 |
| 2020/0019558 | A1* | 1/2020 | Okorafor ........... G06F 21/6254 |
| 2020/0019871 | A1* | 1/2020 | Balakrishnan ......... G06N 5/003 |
| 2020/0162359 | A1* | 5/2020 | Borkar ................ H04L 43/50 |
| 2020/0202037 | A1* | 6/2020 | Parkinson ........... G06F 21/6245 |

OTHER PUBLICATIONS

Brodie, et al., "An Empirical Study of Natural Language Parsing of Privacy Policy Rules Using the SPARCLE Policy Workbench," Copyright IBM Corp. 2006, 12 pages.

Xiao, et al., "Automated Extraction of Security Policies from Natural-Language Software Documents," SIGSOFT'12/FSE-20, Nov. 11-16, 2012, 11 pages.

Le, et al., "Automated Inference of Access Control Policies for Web Applications," SACMAT'15, Jun. 1-3, 2015 Vienna, Austria. Copyright 2015, 11 pages.

Kiyavitskaya, et al., "Automating the Extraction of Rights and Obligations for Regulatory Compliance," Last Accessed: Jan. 16, 2019, 14 pages.

Breaux, et al., "Towards Regulatory Compliance: Extracting Rights and Obligations to Align Requirements with Regulations," 14th IEEE International Requirements Engineering Conference, © 2006, 10 pages.

Karat, et al., "Designing Natural Language and Structured Entry Methods for Privacy Policy Authoring," Last Accessed: Jan. 16, 2019, 15 pages.

Sapkota, et al., "Extracting Meaningful Entities from Regulatory Text," ©2012 IEEE, 4 pages.

Hamdaqa, "Citation Analysis: An Approach for Facilitating the Analysis of Regulatory Compliance Documents," Dec. 2009, 85 pages.

Pasetta, et al., "RTS—An Integrated Analytic Solution for Managing Regulation Changes and their Impact on Business Compliance," © 2013 ACM, 8 pages.

Kähmer, et al., "Automating Privacy Compliance with ExPDT," 10th IEEE Conference on E-Commerce Technology and the Fifth IEEE Conference on Enterprise Computing, E-Commerce and E-Services, © 2008 IEEE, 8 pages.

\* cited by examiner

5.3.2 Anonymization Techniques

It should be noted that each anonymization technique has its own strengths and weaknesses. The robustness of each anonymization technique is based upon the aforementioned [...] For the purpose of this document, *direct identifiers* refers specifically to *elements that permit direct recognition or communication with the corresponding individual such as names, email addresses (while preserving top level domain) or telephone numbers.* [...] Any *direct identifiers should be redacted, e.g. name, email, phone number, signature, full address.* [...] For public data release, adversaries are most likely interested in showing that an attack is possible (demonstration attack). [...] *Masking of pre-specified variables can be done manually or with the use of software that can help identify variables that need redaction.* [...] An organisation sees a financial interest in finding out who are the trial participants in the clinical trial. [...] *Aggregation* involves *the replacement of a value by a range.* [...] A random event in which an individual happens to examine a report including data on a trial participant with whom they are well acquainted to the extent that they can accurately guess that certain information relates to that trial participant.

FIG. 6

| Entity Type | Compliance Entities Extracted Type |
|---|---|
| Definition Target — 702a | Direct identifiers — 704a |
| Definition Content — 702b | Elements that permit direct recognition or communication with the corresponding individual such as names, email addresses or telephone numbers. — 704b |
| Actionable Obligation — 702c | Direct identifiers should be redacted, e.g. name, email, phone number, signature, full address. — 704c |
| Non Actionable Obligation — 702d | Masking of pre-specified variables can be done manually or with the use of software that can help identify variables that need redaction — 704d |
| Obligation Target — 702e | Direct identifiers — 704e |
| Obligation Content — 702n | Should be redacted, e.g. name, email, phone number, signature, full address. — 704n |

FIG. 7

Sensitive Data Policy Rules 800

| Role | Action | Comments |
|------|--------|----------|
| All — 804a | Mask name | *No specific technique specified* — 806a |
| All — 804b | Mask email | *Preserve top level domain* — 806b |
| All — 804n | Mask addresses | *No specific technique specified* — 806n |

SENSITIVE DATA POLICY RECOMMENDATION BASED ON COMPLIANCE OBLIGATIONS OF A DATA SOURCE

BACKGROUND

The subject disclosure relates to information retrieval and policy recommendation systems, and more specifically, to extraction of compliance obligations from a data source and recommendation of a sensitive data policy based on such compliance obligations.

Sensitive data policy generation involves the identification of legislation relevant to sensitive data concerns and deriving rules which can constrain the processing of existing sensitive data in accordance with such legislation. Identifying and tracking the relevant legislation as well as interpreting and converting such legislation into data specific constraints however is very time consuming.

A problem with existing information retrieval (IR) systems and/or techniques employed in sensitive data policy generation is that they fail to identify portions of legal documents containing actionable legislation and they fail to map such actionable legislation to certain sensitive data repositories. These tasks must be performed manually by large cross-disciplinary teams of lawyers and information technology (IT) experts.

Another problem with such existing IR systems and/or techniques is that they do not automatically (e.g., without action by a human user) generate sensitive data policy recommendations directly from data source documents (e.g., legal documents). Another problem with such existing IR systems and/or techniques is that they cannot capture all obligations, entities, and/or definitions of a data source document (e.g., a legal document), as they use keyword search techniques and/or pattern techniques. Another problem with such existing IR systems and/or techniques is that they do not distinguish entities mentioned within a data source document (e.g., a legal document) as being the subject of, or not, an obligation or a definition. Another problem with such existing IR systems and/or techniques is that they do not provide the ability to track and/or compare relevant regulations over time which requires additional manual efforts.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate sensitive data policy recommendation are described.

According to an embodiment, a system can comprise a memory that stores computer executable components and a processor that executes the computer executable components stored in the memory. The computer executable components can comprise an extraction component that can employ an artificial intelligence model to extract compliance data from a data source. The computer executable components can further comprise a recommendation component that can recommend a sensitive data policy based on the compliance data. An advantage of such a system is that it can automatically (e.g., without action by a human user): extract compliance data (e.g., obligations, obligation targets, obligation content, actionable obligations, definitions, definition targets, definition content, etc.) directly from one or more legal documents (e.g., legislation documents); and recommend an existing sensitive data policy corresponding to a sensitive data dataset that is susceptible to various sensitive data policies.

In some embodiments, the recommendation component can further identify one or more sensitive data entities of a sensitive data dataset that are affected by actionable obligation data of the data source. An advantage of such a system is that it can automatically (e.g., without action by a human user) identify one or more keywords of a sensitive data dataset that are affected by an actionable obligation, thereby enabling customized recommendation of a certain existing sensitive data policy corresponding to such one or more keywords and/or such a sensitive data dataset.

According to another embodiment, a computer-implemented method can comprise employing, by a system operatively coupled to a processor, an artificial intelligence model to extract compliance data from a data source. The computer-implemented method can further comprise recommending, by the system, a sensitive data policy based on the compliance data. An advantage of such a computer-implemented method is that it can be implemented to automatically (e.g., without action by a human user): extract compliance data (e.g., obligations, obligation targets, obligation content, actionable obligations, definitions, definition targets, definition content, etc.) directly from one or more legal documents (e.g., legislation documents); and recommend an existing sensitive data policy corresponding to a sensitive data dataset that is susceptible to various sensitive data policies.

In some embodiments, the computer-implemented method can further comprise identifying, by the system, one or more sensitive data entities of a sensitive data dataset that are affected by actionable obligation data of the data source. An advantage of such a computer-implemented method is that it can be implemented to automatically (e.g., without action by a human user) identify one or more keywords of a sensitive data dataset that are affected by an actionable obligation, thereby enabling customized recommendation of a certain existing sensitive data policy corresponding to such one or more keywords and/or such a sensitive data dataset.

According to another embodiment, a computer program product facilitating a sensitive data policy recommendation process is provided. The computer program product comprising a computer readable storage medium having program instructions embodied therewith, the program instructions executable by a processor to cause the processor to employ, by the processor, an artificial intelligence model to extract compliance data from a data source. The program instructions are further executable by the processor to cause the processor to recommend, by the processor, a sensitive data policy based on the compliance data. An advantage of such a computer program product is that it can automatically (e.g., without action by a human user): extract compliance data (e.g., obligations, obligation targets, obligation content, actionable obligations, definitions, definition targets, definition content, etc.) directly from one or more legal documents (e.g., legislation documents); and recommend an existing sensitive data policy corresponding to a sensitive data dataset that is susceptible to various sensitive data policies.

In some embodiments, the program instructions are further executable by the processor to cause the processor to identify, by the processor, one or more sensitive data entities of a sensitive data dataset that are affected by actionable obligation data of the data source. An advantage of such a computer program product is that it can automatically (e.g., without action by a human user) identify one or more keywords of a sensitive data dataset that are affected by an actionable obligation, thereby enabling customized recommendation of a certain existing sensitive data policy corresponding to such one or more keywords and/or such a sensitive data dataset.

DESCRIPTION OF THE DRAWINGS

FIG. 6 illustrates an example, non-limiting information that can facilitate sensitive data policy recommendation components in accordance with one or more embodiments described herein.

FIG. 7 illustrates an example, non-limiting table that can facilitate sensitive data policy recommendation components in accordance with one or more embodiments described herein.

FIG. 8 illustrates an example, non-limiting table that can facilitate sensitive data policy recommendation components in accordance with one or more embodiments described herein.

DETAILED DESCRIPTION

Figure 1:
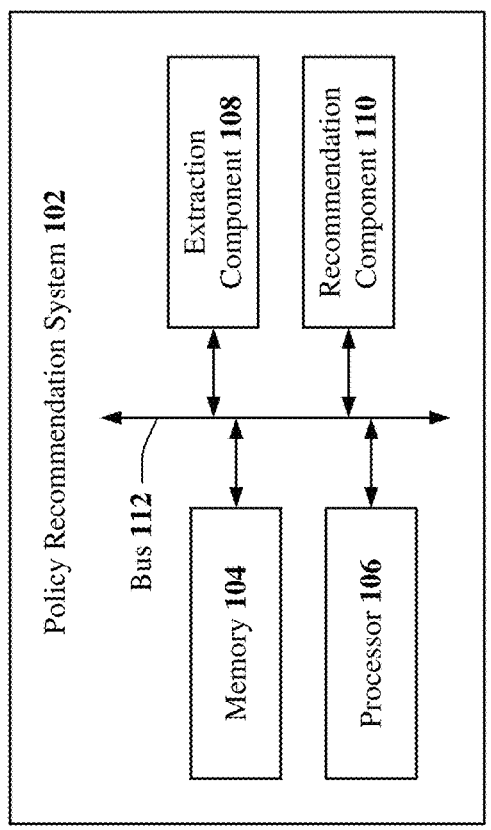
FIG. 1 illustrates a block diagram of an example, non-limiting system that can facilitate sensitive data policy recommendation components in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Given the above problem with existing information retrieval (IR) systems and/or techniques employed in data policy generation that fail to identify portions of legal documents containing actionable legislation, fail to identify entities affected by such actionable legislation, and fail to map such actionable legislation to specific sensitive data repositories, the present disclosure can be implemented to produce a solution to this problem in the form of systems, computer-implemented methods, or computer program products that can employ an artificial intelligence model to extract compliance data from a data source and recommend a sensitive data policy based on the compliance data. An advantage of such systems, computer-implemented methods, or computer program products is that they can automatically (e.g., without action by a human user): extract compliance data (e.g., obligations, obligation targets, obligation content, actionable obligations, definitions, definition targets, definition content, etc.) directly from one or more legal documents (e.g., legislation documents); and recommend an existing sensitive data policy corresponding to a sensitive data dataset that is susceptible to various sensitive data policies.

In some embodiments, the present disclosure can be implemented to produce a solution to the problem described above in the form of systems, computer-implemented methods, or computer program products that can identify one or more sensitive data entities of a sensitive data dataset that are affected by actionable obligation data of the data source. An advantage of such systems, computer-implemented methods, or computer program products is that they can automatically (e.g., without action by a human user) identify one or more keywords of a sensitive data dataset that are affected by an actionable obligation, thereby enabling customized recommendation of a certain existing sensitive data policy corresponding to such one or more keywords and/or such a sensitive data dataset.

Furthermore, given the above problem with existing information retrieval (IR) systems and/or techniques employed in data policy generation that fail to capture all obligations, entities, and/or definitions of a data source document (e.g., a legal document), the present disclosure can be implemented to produce a solution to this problem in the form of systems, computer-implemented methods, or computer program products that can automatically (e.g., without action by a human user) extract all compliance data (e.g., obligations, obligation targets, obligation content, actionable obligations, definitions, definition targets, definition content, etc.) directly from a data source document (e.g., a legal document). An advantage of such systems, computer-implemented methods, or computer program products is that they can ensure that all such compliance data is extracted and analyzed in recommending a sensitive data policy.

Moreover, given the above problem with existing information retrieval (IR) systems and/or techniques employed in data policy generation that fail to automatically (e.g., without action by a human user) generate sensitive data policy recommendations directly from data source documents (e.g., legal documents), the present disclosure can be implemented to produce a solution to this problem in the form of systems, computer-implemented methods, or computer program products that can automatically (e.g., without action by a human user) generate sensitive data policy recommendations directly from data source documents (e.g., legal documents). An advantage of such systems, computer-implemented methods, or computer program products is that they can eliminate the need of an entity (e.g., a human) to interpret such data source documents and recommend a corresponding sensitive data policy.

FIG. 1 illustrates a block diagram of an example, non-limiting system 100 that can facilitate sensitive data policy recommendation components in accordance with one or more embodiments described herein. According to several embodiments, system 100 can comprise a policy recommendation system 102. In some embodiments, policy recommendation system 102 can comprise a memory 104, a processor 106, an extraction component 108, a recommendation component 110, and/or a bus 112.

It should be appreciated that the embodiments of the subject disclosure depicted in various figures disclosed herein are for illustration only, and as such, the architecture of such embodiments are not limited to the systems, devices, or components depicted therein. For example, in some embodiments, system 100 and/or policy recommendation system 102 can further comprise various computer or computing-based elements described herein with reference to operating environment 1000 and FIG. 10. In several embodiments, such computer or computing-based elements can be used in connection with implementing one or more of the systems, devices, components, or computer-implemented operations shown and described in connection with FIG. 1 or other figures disclosed herein.

According to multiple embodiments, memory 104 can store one or more computer or machine readable, writable, or executable components or instructions that, when executed by processor 106, can facilitate performance of operations defined by the executable component(s) or instruction(s). For example, memory 104 can store computer or machine readable, writable, or executable components or instructions that, when executed by processor 106, can facilitate execution of the various functions described herein relating to policy recommendation system 102, extraction component 108, recommendation component 110, and/or another component associated with policy recommendation system 102, as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. Further examples of processor 106 are described below with reference to processing unit 1014 and FIG. 10. Such examples of processor 106 can be employed to implement any embodiments of the subject disclosure.

In some embodiments, policy recommendation system 102, memory 104, processor 106, extraction component 108, recommendation component 110, and/or another component of policy recommendation system 102 as described herein can be communicatively, electrically, and/or operatively coupled to one another via a bus 112 to perform functions of system 100, policy recommendation system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 1018 and FIG. 10. Such examples of bus 112 can be employed to implement any embodiments of the subject disclosure.

In some embodiments, policy recommendation system 102 can comprise any type of component, machine, device, facility, apparatus, and/or instrument that comprises a processor and/or can be capable of effective and/or operative communication with a wired and/or wireless network. All such embodiments are envisioned. For example, policy recommendation system 102 can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, policy recommendation system 102 can be coupled (e.g., communicatively, electrically, operatively, etc.) to one or more external systems, sources, and/or devices (e.g., computing devices, communication devices, etc.) via a data cable (e.g., High-Definition Multimedia Interface (HDMI), recommended standard (RS) 232, Ethernet cable, etc.). In some embodiments, policy recommendation system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and/or wireless networks, including, but not limited to, a cellular network, a wide area network (WAN) (e.g., the Internet), and/or a local area network (LAN). For example, policy recommendation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultrawideband (UWB) standard protocol, and/or other proprietary and non-proprietary communication protocols. In such an example, policy recommendation system 102 can thus include hardware (e.g., a central processing unit (CPU), a transceiver, a decoder), software (e.g., a set of threads, a set of processes, software in execution) and/or a combination of hardware and software that facilitates communicating information between policy recommendation system 102 and external systems, sources, and/or devices (e.g., computing devices, communication devices, etc.).

According to multiple embodiments, policy recommendation system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with policy recommendation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, extraction component 108, recommendation component 110, and/or any other components associated with policy recommendation system 102 as disclosed herein (e.g., communicatively, electronically, and/or operatively coupled with or employed by policy recommendation system 102), can comprise such computer and/or machine readable, writable, and/or executable component(s) and/or instruction(s). Consequently, according to numerous embodiments, policy recommendation system 102 and/or any components associated therewith as disclosed herein, can employ processor 106 to execute such computer and/or machine readable, writable, and/or executable component(s) and/or instruction(s) to facilitate performance of one or more operations described herein with reference to policy recommendation system 102 and/or any such components associated therewith.

In some embodiments, to implement one or more sensitive data policy recommendations, policy recommendation system 102 can facilitate performance of operations executed by and/or associated with extraction component 108, recommendation component 110, and/or another component associated with policy recommendation system 102 as disclosed herein. For example, as described in detail below, policy recommendation system 102 can facilitate: employing an artificial intelligence model to extract compliance data from a data source; recommending a sensitive data policy based on the compliance data; extracting, from the data source, compliance entity data, obligation data, obligation target data, obligation content data, actionable obligation data, non-actionable obligation data, definition data, definition target data, definition content data, data properties, entity properties, entity relationship data, and/or role of data consumer; segmenting the data source into compliance sections comprising an obligation section and/or a definition section; classifying obligation data of the data source into an actionable obligation data and/or a nonactionable obligation data; mapping actionable obligation data to one or more sensitive data entities of a sensitive data dataset; and/or identifying one or more sensitive data entities of a sensitive data dataset that are affected by actionable obligation data of the data source.

As referenced herein, an obligation (also referred to herein as obligation data) can comprise a sentence describing a regulation affecting a legal entity (e.g., "The importer and manufacturer of mercury-added button cell batteries must have the documents confirming the quantity of exported products").

As referenced herein, an obligation target (also referred to herein as obligation target data) can comprise the legal entity affected by a regulation mentioned within an obligation (e.g., "The importer and manufacturer of mercury-added button cell batteries").

As referenced herein, obligation content (also referred to herein as obligation content data) can comprise the regulation affecting the legal entity (e.g., "must have the documents confirming the quantity of exported products").

As referenced herein, an actionable obligation can comprise an obligation which can be mapped directly to a set of rule-based constraints for a given set of entities stored in a database (e.g., "any direct identifiers should be redacted, e.g. name, email, phone number, signature, full address").

As referenced herein, a non-actionable obligation can comprise an obligation which cannot be mapped to a set of rule-based constraints for a given set of entities stored in a database (e.g., "Masking of pre-specified variables can be done manually or with the use of software that can help identify variables that need redaction").

As referenced herein, a definition (also referred to herein as definition data) can comprise a sentence which defines a specific concept for the purpose and within the context of a given legal document (e.g., "Aggregation involves the replacement of a value by a range").

As referenced herein, a definition target (also referred to herein as definition target data) can comprise a concept mentioned in a sentence for which a definition valid specifically within the context of a given legal document is provided (e.g., "Aggregation").

As referenced herein, definition content (also referred to herein as definition content data) can comprise the part of a sentence defining the definition target (e.g., "replacement of a value by a range").

As referenced herein, sensitive data policies can comprise the set of actions to be applied on data in order to protect sensitive data of an individual (e.g., name, telephone number, e-mail address, etc.).

As referenced herein, masking and/or generalization can comprise one or more perturbation methods that replace original values with fictional and/or random values.

As referenced herein, consent management can comprise the framework to ensure consent is provided for the specific data access and processing.

As referenced herein, access control can comprise the set of mechanisms that ensure the correct set of roles (e.g., role of data consumer) have access to a specific asset (e.g., data, device, etc.).

As referenced herein, a compliance entity (also referred to herein as compliance entity data) can comprise, for instance, an obligation target, obligation content, a definition target, definition content, and/or another compliance entity.

As referenced herein, a data property can comprise, for instance, a name, a telephone number, an e-mail address, and/or another data property.

As referenced herein, an entity property can comprise, for instance, a name of an entity, a label of an entity, a type of an entity, a role of an entity, a synonym of an entity, and/or another entity property.

As referenced herein, data consumer can comprise the entity consuming the data (e.g., the entity using the data of another entity).

As referenced herein, a role of a data consumer can comprise the role, title, and/or function of a data consumer (e.g., a scientist, a tester, production personnel, etc.).

As referenced herein, a data processing technique can comprise, for instance, masking, grouping, generalization, and/or another data processing technique.

In some embodiments, system 100 and/or policy recommendation system 102 can receive one or more data sources and/or one or more keywords relevant to one or more sensitive data datasets (e.g., keywords of such sensitive data datasets susceptible to one or more sensitive data policies such as, for instance, names, telephone numbers, e-mails, etc.). For example, system 100 and/or policy recommendation system 102 can receive such data sources (e.g., a legal document, a legislation document, a guidance document, a regulatory document, a compliance document, a contract, etc.) and/or keywords via an interface component (e.g., an application programming interface (API), a graphical user interface (GUI), etc.) of system 100 and/or policy recommendation system 102 (e.g., not illustrated in the figures).

In some embodiments, system 100 and/or policy recommendation system 102 can receive one or more first data sources (e.g., a first legal document, a first legislation document, a first compliance document, etc.). In these embodiments, system 100 and/or policy recommendation system 102 can further receive, simultaneously or subsequently (e.g., at a later time), one or more second data sources (e.g., a second legal document, a second legislation document, a second compliance document, etc.). In these embodiments, such second data sources can comprise one or more iterations of the first data sources and/or one or more data sources that are different from the first data sources. For example, such second data sources can comprise one or more previous or subsequent iterations of the first data sources (e.g., older outdated versions of the first data sources or newer updated, modified, or otherwise revised versions of the first data sources). In another example, such second data sources can comprise one or more data sources that are different from the first data sources (e.g., different in type, different in content, different in origin, different in authorship, etc.). In some embodiments, policy recommendation system 102 can facilitate storing all such data sources (e.g., the first and/or second data sources described above) and/or keywords in a database such as, for example, memory 104.

In some embodiments, policy recommendation system 102 and/or extraction component 108 can extract text from one or more data sources described above. For example, policy recommendation system 102 and/or extraction component 108 can extract all text, or portions thereof (e.g., one or more words, sentences, paragraphs, footnotes, etc.), from one or more data sources by employing an artificial intelligence model (e.g., as described below with reference to extraction component 108) or by executing read and/or write operations using processor 106.

In some embodiments, policy recommendation system 102 can facilitate segmenting a data source. For example, policy recommendation system 102 can facilitate segmenting (e.g., via segmentation component 202 described below with reference to FIG. 2) a data source into one or more compliance sections that can comprise one or more obligation sections and/or one or more definition sections. In some embodiments, such obligation sections and/or definition sections can comprise, for instance, a sentence, a paragraph, a header, a footnote, and/or another portion of a data source.

In some embodiments, to facilitate such segmentation, policy recommendation system 102 can employ, for instance, a random forest algorithm, a rule-based system, or a heuristic segmentation algorithm to segment a data source into such compliance sections described above. For example, policy recommendation system 102 can employ a random forest algorithm, a rule-based system, or a heuristic segmentation algorithm to segment a data source into one or more obligation sections and/or one or more definition sections.

According to multiple embodiments, extraction component 108 can employ an artificial intelligence model (AI model) to extract compliance data from a data source. For example, extraction component 108 can employ an AI model to extract compliance data from the sections of a data source (e.g., the compliance sections) that can be segmented by policy recommendation system 102 (e.g., via segmentation component 202) as described above.

In some embodiments, extraction component 108 can employ an artificial intelligence model (AI model) to extract compliance data from a data source including, but not limited to: a legal document, a legislation document, a guidance document, a regulatory document, a compliance document, a contract, and/or another data source. In some embodiments, extraction component 108 can employ an AI model to extract compliance data from one or more compliance sections of a data source (e.g., the segmented sections described above). For example, extraction component 108 can employ an AI model to extract compliance data including, but not limited to: compliance entity data, obligation data, obligation target data, obligation content data, actionable obligation data, non-actionable obligation data, definition data, definition target data, definition content data, a data property, an entity property, entity relationship data, a role of a data consumer, a data processing technique, and/or other compliance data. In some embodiments, such compliance data can comprise data related to In some embodiments, to facilitate such extraction described above, extraction component 108 can comprise and/or employ an AI model and/or a machine learning model (ML model) including, but not limited to, a classification model, a probabilistic model, statistical-based model, an inference-based model, a deep learning model, a neural network, long short-term memory (LSTM), fuzzy logic, expert system, Bayesian model, and/or another model that can extract such compliance data described above. For example, extraction component 108 can comprise and/or employ an AI model that can utilize, for instance, long short-term memory (LSTM), a reasoning algorithm, natural language annotation, and/or natural language processing (NLP) to perform data extraction and/or data annotation of such compliance data described above.

In some embodiments, extraction component 108 can employ an AI model (e.g., LSTM, NLP, etc.) to extract one or more obligation sentences from an obligation section described above and/or one or more definition sentences from a definition section described above. In some embodiments, extraction component 108 can further employ an AI model (e.g., LSTM, NLP, etc.) to extract the compliance data defined above from such obligation sentences and/or definition sentences. For example, extraction component 108 can employ an AI model (e.g., LSTM, NLP, etc.) to extract definition data, definition target data, definition content data, and/or other data from such definition sentences. In another example, extraction component 108 can employ an AI model (e.g., LSTM, NLP, etc.) to extract obligation data, obligation target data, obligation content data, and/or other data from such obligation sentences.

In some embodiments, extraction component 108 can employ an AI model (e.g., LSTM, NLP, etc.) to extract new compliance data and/or revised compliance data from a second data source, where the second data source can comprise an iteration of the data source or a different data source. For example, as described above, system 100 and/or policy recommendation system 102 can receive (e.g., via an API, a GUI, etc.) a first data source and can further receive, simultaneously or subsequently (e.g., at a later time), a second data source, where such second data source can comprise an iteration of the first data source (e.g., a previous iteration or a subsequent iteration) or a data source that is different from the first data source (e.g., different in type, different in content, different in origin, different in authorship, etc.). In some embodiments, policy recommendation system 102 and/or extraction component 108 can compare (e.g., via reading by processor 106) such a first data source to such a second data source to determine whether the second data source comprises compliance data not present in the first data source, or vice versa. For example, policy recommendation system 102 and/or extraction component 108 can compare the first data source to the second data source to determine whether the second data source comprises new compliance data and/or revised compliance data not present in the first data source, or vice versa. In some embodiments, extraction component 108 can further extract such new compliance data and/or revised compliance data from the second data source, and/or conversely, from the first data source. For example, extraction component 108 can extract such new and/or revised compliance data by employing an AI model (e.g., LSTM, NLP, etc.) or by executing read and/or write operations using processor 106.

In some embodiments, policy recommendation system 102 can facilitate classifying data of a data source. For example, policy recommendation system 102 can facilitate classifying (e.g., via classification component 302 described below with reference to FIG. 3) obligation data of a data source into actionable obligation data or nonactionable obligation data.

In some embodiments, to facilitate such classification, policy recommendation system 102 can employ an AI model such as, for instance, a neural network or a classification model to classify obligation data of a data source into actionable obligation data or nonactionable obligation data. For example, policy recommendation system 102 can employ such a neural network or classification model to classify obligation data into actionable obligations (e.g., compliance data 702c and/or compliance entity 704c) and/or nonactionable obligations (e.g., compliance data 702d and/or compliance entity 704d) described below and illustrated in FIG. 7.

In some embodiments, policy recommendation system 102 can facilitate mapping data of a data source to one or more entities of a dataset. For example, policy recommendation system 102 can facilitate mapping (e.g., via map component 402 described below with reference to FIG. 4) actionable obligation data to one or more sensitive data entities (e.g., names, telephone numbers, e-mail addresses, etc.) of a sensitive data dataset.

In some embodiments, to facilitate such mapping, policy recommendation system 102 can employ a keyword search or a mapping algorithm to map data of a data source to one or more entities of a dataset. For example, policy recommendation system 102 can employ a keyword search or a mapping algorithm to map actionable obligation data to one or more sensitive data entities of a sensitive data dataset. For instance, policy recommendation system 102 can employ a keyword search or a mapping algorithm to map actionable obligation data (e.g., compliance data 702c and/or compliance entity 704c) to one or more keywords of a sensitive data dataset received by policy recommendation system 102 as described above, where such keywords can constitute such sensitive data entities.

In some embodiments, recommendation component 110 can identify one or more sensitive data entities of a sensitive data dataset that are affected by actionable obligation data of a data source. For example, based on mapping actionable obligation data to one or more sensitive data entities of a sensitive data dataset as described above, recommendation component 110 can identify one or more of such sensitive data entities of the sensitive data dataset that are affected by actionable obligation data of a data source. For example, based on mapping such actionable obligation data to one or more keywords of a sensitive data dataset received by policy recommendation system 102, recommendation component 110 can facilitate identifying one or more of such keywords of the sensitive data dataset that are affected by actionable obligation data of a data source.

In some embodiments, recommendation component 110 can recommend one or more sensitive data policies based on compliance data. For example, recommendation component 110 can recommend a sensitive data policy based on compliance data by mapping actionable obligation data (e.g., entities present within actionable obligations) to certain sensitive data policies corresponding to a given set of entities (e.g., keywords of a sensitive data dataset) stored in a database (e.g., memory 104). For instance, recommendation component 110 can recommend a sensitive data policy based on compliance data by mapping (e.g., via a keyword search or a mapping algorithm) such actionable obligations to certain sensitive data policies comprising rule-based constraints (e.g., repository-specific data constraint rules) corresponding to such a given set of entities stored in such a database. In these examples, recommendation component 110 can recommend a certain sensitive data policy (e.g., a certain existing sensitive data policy) corresponding to one or more entities of a sensitive data dataset that recommendation component 110 can identify as being affected by actionable obligation data of a data source.

Figure 2:
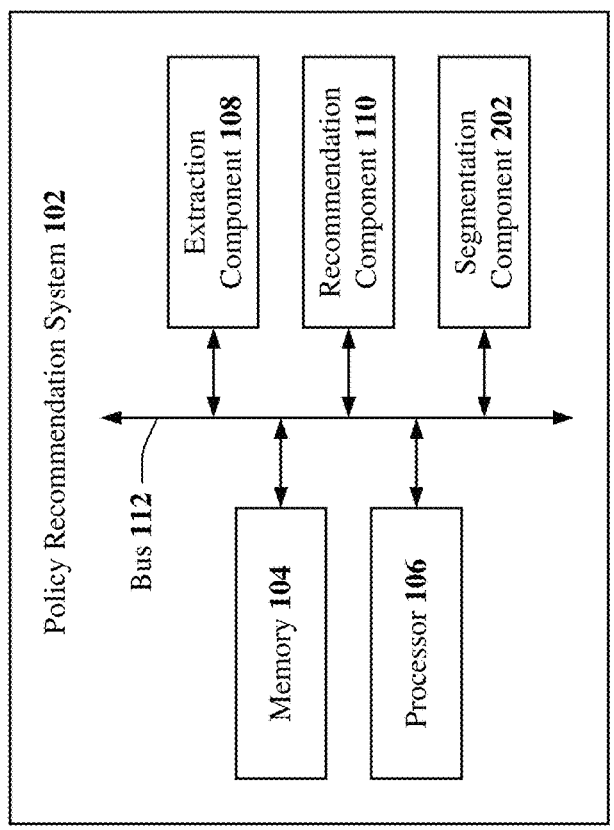
FIG. 2 illustrates a block diagram of an example, non-limiting system that can facilitate sensitive data policy recommendation components in accordance with one or more embodiments described herein.

FIG. 2 illustrates a block diagram of an example, non-limiting system 200 that can facilitate sensitive data policy recommendation components in accordance with one or more embodiments described herein. In some embodiments, system 200 can comprise policy recommendation system 102. In some embodiments, policy recommendation system 102 can comprise a segmentation component 202. Repetitive description of like elements or processes employed in respective embodiments is omitted for sake of brevity.

According to multiple embodiments, segmentation component 202 can segment a data source into one or more compliance sections that can comprise one or more obligation sections and/or one or more definition sections. In some embodiments, such obligation sections and/or definition sections can comprise, for instance, a sentence, a paragraph, a header, a footnote, and/or another portion of a data source.

In some embodiments, to facilitate segmentation, segmentation component 202 can employ, for instance, a random forest algorithm, a rule-based system, or a heuristic segmentation algorithm to segment a data source into such compliance sections described above. For example, segmentation component 202 can employ a random forest algorithm, a rule-based system, or a heuristic segmentation algorithm to segment a data source into one or more obligation sections and/or one or more definition sections.

Figure 3:
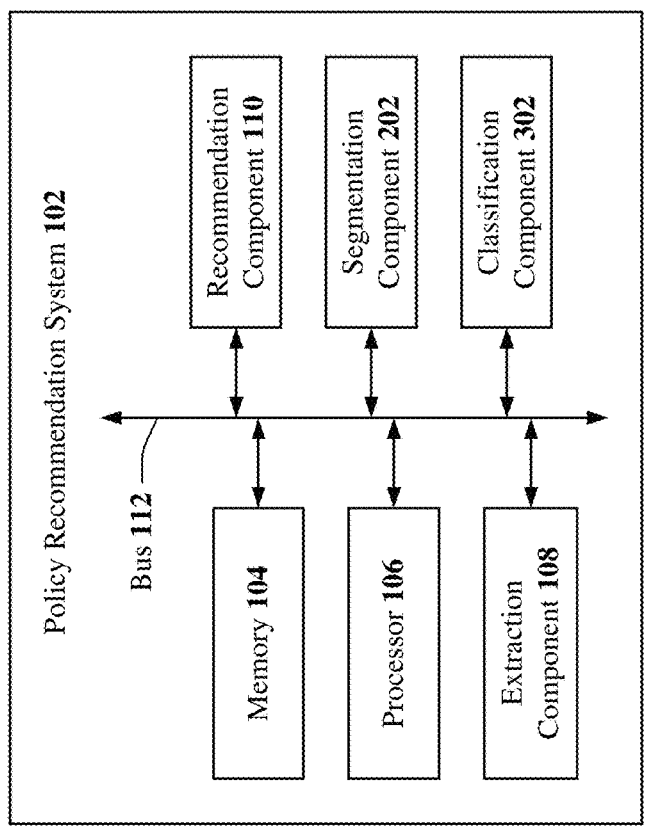
FIG. 3 illustrates a block diagram of an example, non-limiting system that can facilitate sensitive data policy recommendation components in accordance with one or more embodiments described herein.

FIG. 3 illustrates a block diagram of an example, non-limiting system 300 that can facilitate sensitive data policy recommendation components in accordance with one or more embodiments described herein. In some embodiments, system 300 can comprise policy recommendation system 102. In some embodiments, policy recommendation system 102 can comprise a classification component 302. Repetitive description of like elements or processes employed in respective embodiments is omitted for sake of brevity.

According to multiple embodiments, classification component 302 can classify data of a data source. For example, classification component 302 can classify obligation data of a data source into actionable obligation data and/or nonactionable obligation data.

In some embodiments, to facilitate such classification, classification component 302 can employ an AI model such as, for instance, a neural network or a classification model to classify obligation data of a data source into actionable obligation data or nonactionable obligation data. For example, classification component 302 can employ such a neural network or classification model to classify obligation data into actionable obligations (e.g., compliance data 702c and/or compliance entity 704c) and/or nonactionable obligations (e.g., compliance data 702d and/or compliance entity 704d) described below and illustrated in FIG. 7.

Figure 4:
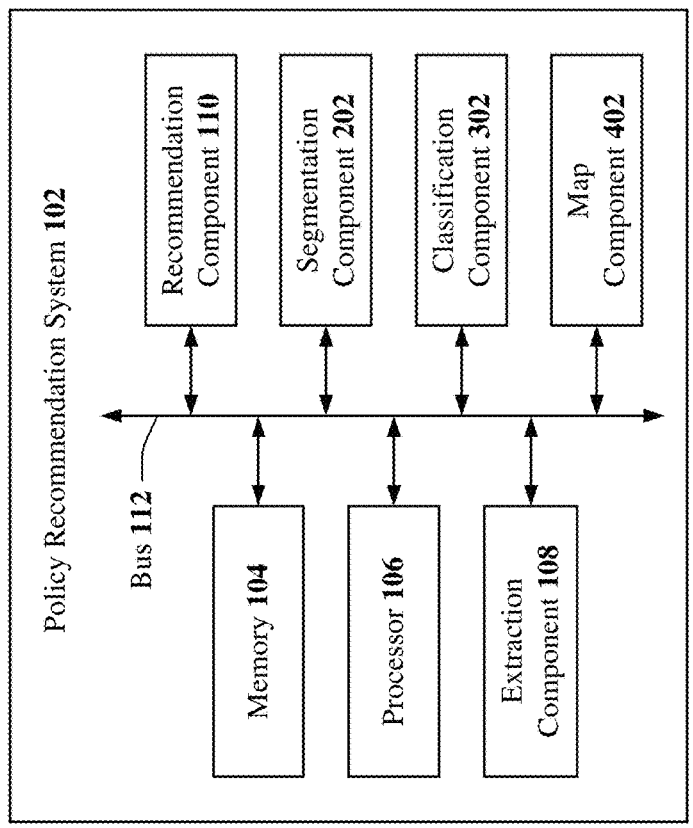
FIG. 4 illustrates a block diagram of an example, non-limiting system that can facilitate sensitive data policy recommendation components in accordance with one or more embodiments described herein.

FIG. 4 illustrates a block diagram of an example, non-limiting system 400 that can facilitate sensitive data policy recommendation components in accordance with one or more embodiments described herein. In some embodiments, system 400 can comprise policy recommendation system 102. In some embodiments, policy recommendation system 102 can comprise a map component 402. Repetitive description of like elements or processes employed in respective embodiments is omitted for sake of brevity.

According to multiple embodiments, map component 402 can map actionable obligation data to one or more sensitive data entities of a sensitive data dataset. For example, map component 402 can map actionable obligation data to one or more sensitive data entities (e.g., names, telephone numbers, e-mail addresses, etc.) of a sensitive data dataset.

In some embodiments, to facilitate such mapping, map component 402 can employ a keyword search or a mapping algorithm to map data of a data source to one or more entities of a dataset. For example, map component 402 can employ a keyword search or a mapping algorithm to map actionable obligation data to one or more sensitive data entities of a sensitive data dataset. For instance, map component 402 can employ a keyword search or a mapping algorithm to map actionable obligation data (e.g., compliance data 702c and/or compliance entity 704c) to one or more keywords of a sensitive data dataset received by policy recommendation system 102 as described above, where such keywords can constitute such sensitive data entities.

Figure 5:
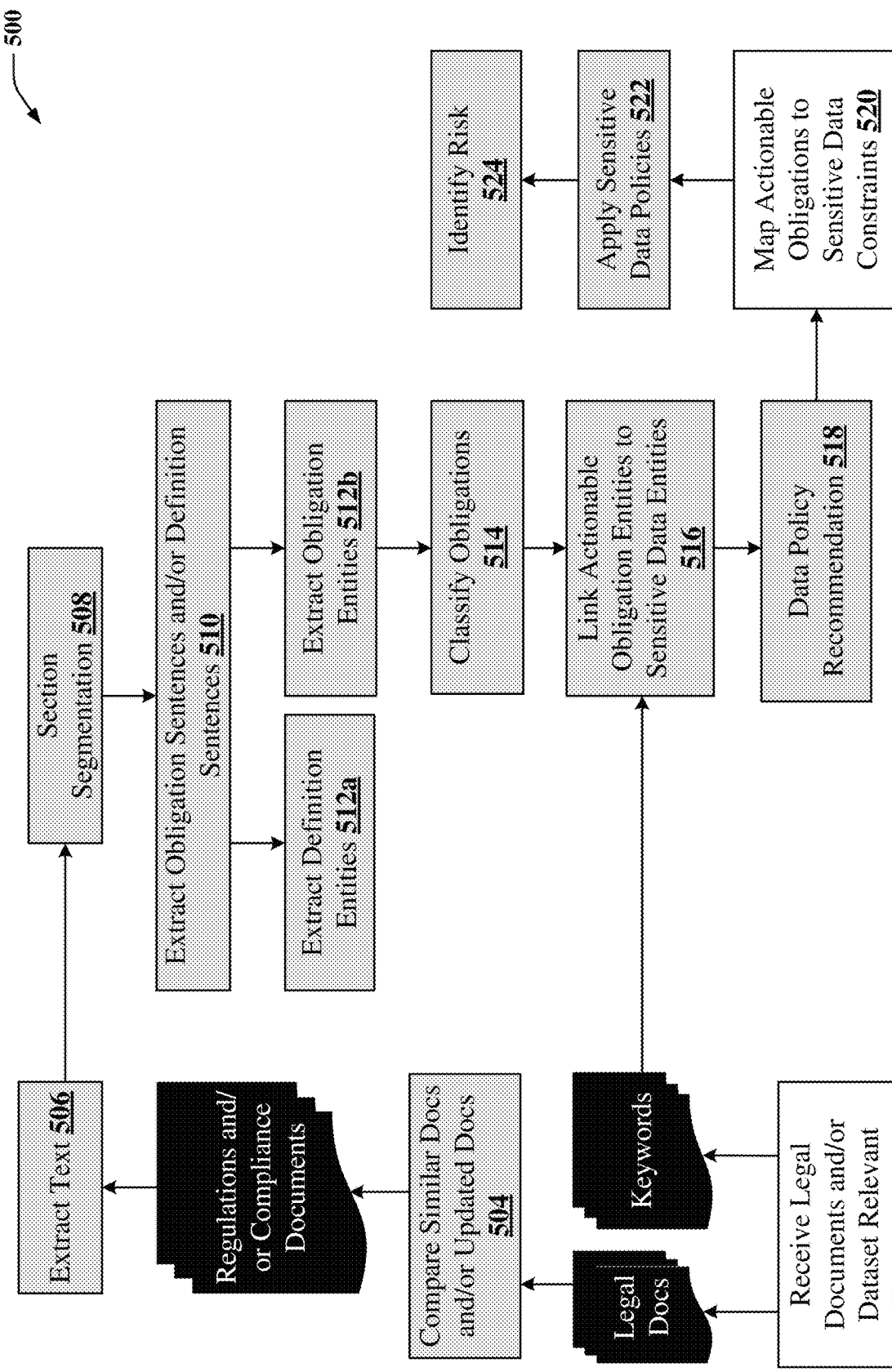
FIG. 5 illustrates a flow diagram of an example, non-limiting computer-implemented method that can facilitate a sensitive data policy recommendation process in accordance with one or more embodiments described herein.

FIG. 5 illustrates a flow diagram of an example, non-limiting computer-implemented method 500 that can facilitate a sensitive data policy recommendation process in accordance with one or more embodiments described herein. Repetitive description of like elements or processes employed in respective embodiments is omitted for sake of brevity.

In some embodiments, at 502, computer-implemented method 500 can comprise receiving one or more legal documents and/or one or more keywords relevant to one or more sensitive data datasets. For example, as described above with reference to FIG. 1, policy recommendation system 102 can receive one or more data sources that can comprise legal documents including, but not limited to, legislation documents, guidance documents, regulatory documents, compliance documents, contracts, and/or another legal document via an interface component (e.g., an API, a GUI, etc.) of policy recommendation system 102 (e.g., not illustrated in the figures). In this example, policy recommendation system 102 can further receive (e.g., via an API, GUI, etc.) one or more keywords relevant to one or more sensitive data datasets that can comprise keywords relevant to one or more sensitive data datasets that must be legislation compliant (e.g., keywords of such sensitive data dataset that can be affected by actionable obligation data of such legal document such as, for instance, names, telephone numbers, e-mails, etc.).

In some embodiments, at 504, computer-implemented method 500 can comprise comparing (e.g., via policy recommendation system 102 and/or extraction component 108) similar documents and/or updated documents (e.g., data sources such as, for instance, legal documents). For example, as described above, policy recommendation system 102 can receive (e.g., via an API, a GUI, etc.) a first data source and can further receive, simultaneously or subsequently (e.g., at a later time), a second data source, where such second data source can comprise an iteration of the first data source (e.g., a previous iteration or a subsequent iteration) or a data source that is different from the first data source (e.g., different in type, different in content, different in origin, different in authorship, etc.). In some embodiments, policy recommendation system 102 and/or extraction component 108 can compare (e.g., via reading by processor 106) such a first data source to such a second data source to determine whether the second data source comprises compliance data not present in the first data source, or vice versa. For example, policy recommendation system 102 and/or extraction component 108 can compare the first data source to the second data source to determine whether the second data source comprises new compliance data and/or revised compliance data not present in the first data source, or vice versa. In some embodiments, extraction component 108 can further extract such new compliance data and/or revised compliance data from the second data source, and/or conversely, from the first data source. For example, extraction component 108 can extract such new and/or revised compliance data by employing an AI model (e.g., LSTM, NLP, etc.) or by executing read and/or write operations using processor 106.

In some embodiments, at 506, computer-implemented method 500 can comprise extracting text (e.g., via policy recommendation system 102 and/or extraction component 108). For example, as described above with reference to FIG. 1, policy recommendation system 102 and/or extraction component 108 can extract text from one or more data sources (e.g., legal documents). For instance, policy recommendation system 102 and/or extraction component 108 can extract all text, or portions thereof (e.g., one or more words, sentences, paragraphs, footnotes, etc.), from one or more data sources by employing an AI model (e.g., LSTM, NLP, etc.) or by executing read and/or write operations using processor 106.

In some embodiments, at 508, computer-implemented method 500 can comprise section segmentation (e.g., via policy recommendation system 102 and/or segmentation component 202). For example, as described above with reference to FIGS. 1 and 2, policy recommendation system 102 and/or segmentation component 202 can segment (e.g., by employing a random forest algorithm, a rule-based system, a heuristic segmentation algorithm, etc.) a data source (e.g., a legal document) into one or more compliance sections that can comprise one or more obligation sections and/or one or more definition sections. In some embodiments, such obligation sections and/or definition sections can comprise, for instance, a sentence, a paragraph, a header, a footnote, and/or another portion of a data source.

In some embodiments, at 510, computer-implemented method 500 can comprise extracting (e.g., via policy recommendation system 102 and/or extraction component 108) obligation sentences and/or definition sentences. For example, as described above with reference to FIG. 1, extraction component 108 can employ an AI model (e.g., LSTM, NLP, etc.) to extract compliance data from one or more sections of a data source (e.g., the compliance sections of a legal document) that can be segmented by segmentation component 202 as described above. For instance, extraction component 108 can employ an AI model (e.g., LSTM, NLP, etc.) to extract one or more obligation sentences from an obligation section of such a data source and/or one or more definition sentences from a definition section of such a data source.

In some embodiments, at 512a and 512b, computer-implemented method 500 can comprise extracting (e.g., policy recommendation system 102 and/or extraction component 108) one or more definition entities and/or one or more obligation entities. For example, as described above with reference to FIG. 1, extraction component 108 can employ an AI model (e.g., LSTM, NLP, etc.) to extract the compliance data defined above from such obligation sentences and/or definition sentences that can be extracted by extraction component 108 from a data source as described above. For instance, extraction component 108 can employ an AI model (e.g., LSTM, NLP, etc.) to extract definition data, definition target data, definition content data, and/or other definition entities from such definition sentences. In another example, extraction component 108 can employ an AI model (e.g., LSTM, NLP, etc.) to extract obligation data, obligation target data, obligation content data, and/or other obligation entities from such obligation sentences.

In some embodiments, at 514, computer-implemented method 500 can comprise classifying obligations (e.g., via policy recommendation system 102 and/or classification component 302). For example, as described above with reference to FIGS. 1 and 3, classification component 302 can classify (e.g., via a neural network or a classification model) obligation data of a data source into actionable obligation data or nonactionable obligation data.

In some embodiments, at 516, computer-implemented method 500 can comprise linking (e.g., via policy recommendation system 102 and/or map component 402) actionable obligation entities to sensitive data entities. For example, as described above with reference to FIGS. 1 and 4, map component 402 can map (e.g., by employing a keyword search or a mapping algorithm) actionable obligation data (e.g., actionable obligation entities) to one or more sensitive data entities (e.g., names, telephone numbers, e-mail addresses, etc.) of a sensitive data dataset. For instance, map component 402 can employ a keyword search or a mapping algorithm to map such actionable obligation data to one or more keywords of a sensitive data dataset received by policy recommendation system 102 as described above, where such keywords can constitute such sensitive data entities.

In some embodiments, at 518, computer-implemented method 500 can comprise data policy recommendation (e.g., via policy recommendation system 102 and/or recommendation component 110). For example, as described above with reference to FIG. 1, recommendation component 110 can identify one or more sensitive data entities of a sensitive data dataset that are affected by actionable obligation data of a data source. For instance, based on mapping actionable obligation data to one or more sensitive data entities of a sensitive data dataset as described above at 516, recommendation component 110 can identify one or more of such sensitive data entities of the sensitive data dataset that are affected by actionable obligation data of a data source (e.g., keywords of a sensitive data dataset that are affected by actionable obligation data of a data source). In this example, based on such mapping and identifying described above, recommendation component 110 can recommend one or more sensitive data policies by mapping actionable obligation data (e.g., entities present within actionable obligations) to certain sensitive data policies corresponding to a given set of entities (e.g., keywords of a sensitive data dataset) stored in a database (e.g., memory 104). In this example, recommendation component 110 can recommend a sensitive data policy by mapping (e.g., via a keyword search or a mapping algorithm) such actionable obligations to a certain sensitive data policy (e.g., a certain existing sensitive data policy) comprising rule-based constraints (e.g., repository-specific data constraint rules) corresponding to such a given set of entities stored in such a database.

In some embodiments, at 520, computer-implemented method 500 can comprise mapping (e.g., via policy recommendation system 102, recommendation component 110, map component 402, etc.) actionable obligations to sensitive data constraints (e.g., sensitive data policies). For example, as described above at 518, recommendation component 110 can map (e.g., via a keyword search or a mapping algorithm) actionable obligations to rule-based constraints (e.g., repository-specific data constraint rules) corresponding to a given set of entities (e.g., keywords of a sensitive data dataset) stored in a database (e.g., memory 104). In some embodiments, an entity (e.g., a human user) can employ (e.g., via an API, a GUI, etc.) policy recommendation system 102 and/or components thereof (e.g., extraction component 108, recommendation component 110, segmentation component 202, classification component 302, map component 402, etc.) to identify one or more existing sensitive data policies based on compliance obligations of a data source (e.g., a legal document). In some embodiments, an entity (e.g., a human user) can employ (e.g., via an API, a GUI, etc.) policy recommendation system 102 and/or components thereof (e.g., extraction component 108, recommendation component 110, segmentation component 202, classification component 302, map component 402, etc.) to generate one or more sensitive data policies based on compliance obligations of a data source (e.g., a legal document) that can be processed by policy recommendation system 102 as described above.

In some embodiments, at 522, computer-implemented method 500 can comprise applying (e.g., via policy recommendation system 102, processor 106, an API, a GUI, a human user, etc.) one or more sensitive data policies. For example, an entity (e.g., a human user) can employ (e.g., an API, a GUI, etc.) policy recommendation system 102 to configure one or more policy enforcement points (e.g., actions that must be implemented to comply with sensitive data obligations of a legal document) based on one or more sensitive data policies recommended by recommendation component 110.

In some embodiments, at 524, computer-implemented method 500 can comprise identifying risk (e.g., via policy recommendation system 102, processor 106, an API, a GUI, a human user, etc.). For example, an entity (e.g., a human user) can employ (e.g., an API, a GUI, etc.) policy recommendation system 102 to identify one or more risks associated with applying one or more sensitive data policies recommended by recommendation component 110 and/or generated by such an entity as described above at 520.

FIG. 6 illustrates an example, non-limiting information 600 that can facilitate sensitive data policy recommendation components in accordance with one or more embodiments described herein. Repetitive description of like elements or processes employed in respective embodiments is omitted for sake of brevity.

In some embodiments, information 600 can comprise a compliance section of a data source (e.g., a legal document) that can be extracted from such a data source by policy recommendation system 102 and/or extraction component 108 as described above with reference to FIGS. 1 and 5. In some embodiments, the bold text of information 600 depicted in FIG. 6 can comprise one or more compliance data 702*a*, 702*b*, 702*c*, 702*d*, 702*e*, 702*n* and/or one or more compliance entities 704*a*, 704*b*, 704*c*, 704*d*, 704*e*, 704*n* of table 700 described below and illustrated in FIG. 7.

FIG. 7 illustrates an example, non-limiting table 700 that can facilitate sensitive data policy recommendation components in accordance with one or more embodiments described herein. Repetitive description of like elements or processes employed in respective embodiments is omitted for sake of brevity.

In some embodiments, table 700 can comprise one or more compliance data 702*a*, 702*b*, 702*c*, 702*d*, 702*e*, 702*n* (where n can represent a total quantity of compliance data) and/or one or more compliance entities 704*a*, 704*b*, 704*c*, 704*d*, 704*e*, 704*n* (where n can represent a total quantity of compliance entities). In some embodiments, compliance data 702*a*, 702*b*, 702*c*, 702*d*, 702*e*, 702*n* can comprise compliance data including, but not limited to, compliance entity data (e.g., compliance entities 704*a*, 704*b*, 704*c*, 704*d*, 704*e*, 704*n*), obligation data, obligation target data, obligation content data, actionable obligation data, non-actionable obligation data, definition data, definition target data, definition content data, a data property, an entity property, entity relationship data, a role of a data consumer, a data processing technique, and/or other compliance data.

In some embodiments, compliance data 702*a*, 702*b*, 702*c*, 702*d*, 702*e*, 702*n* and/or compliance entities 704*a*, 704*b*, 704*c*, 704*d*, 704*e*, 704*n* can be extracted from a data source (e.g., via policy recommendation system 102 and/or extraction component 108 as described above with reference to FIGS. 1 and 5). In some embodiments, such compliance data 702*a*, 702*b*, 702*c*, 702*d*, 702*e*, 702*n* and/or compliance entities 704*a*, 704*b*, 704*c*, 704*d*, 704*e*, 704*n* can be segmented into one or more compliance sections (e.g., via policy recommendation system 102 and/or segmentation component 202 as described above with reference to FIGS. 1, 2, and 5). In some embodiments, compliance data 702*a*, 702*b*, 702*c*, 702*d*, 702*e*, 702*n* and/or compliance entities 704*a*, 704*b*, 704*c*, 704*d*, 704*e*, 704*n* can be classified (e.g., via policy recommendation system 102 and/or classification component 302 as described above with reference to FIGS. 1, 3, and 5) into actionable obligations (e.g., compliance data 702*c* and/or compliance entity 704*c*) and/or nonactionable obligations (e.g., compliance data 702*d* and/or compliance entity 704*d*).

FIG. 8 illustrates an example, non-limiting table 800 that can facilitate sensitive data policy recommendation components in accordance with one or more embodiments described herein. Repetitive description of like elements or processes employed in respective embodiments is omitted for sake of brevity.

In some embodiments, table 800 can comprise one or more sensitive data policy rules (e.g., sensitive data policies) that can comprise the rule-based constraints (e.g., repository-specific data constraint rules) described above with reference to FIGS. 1 and 5. In some embodiments, such sensitive data policy rules of table 800 can comprise one or more roles 802*a*, 802*b*, 802*n* (where n can represent a total quantity of roles), which can comprise roles of a data consumer as defined above (e.g., a scientist, a tester, production personnel, etc.). In some embodiments, such sensitive data policy rules of table 800 can comprise one or more actions 804*a*, 804*b*, 804*n* (where n can represent a total quantity of actions), which can comprise actionable obligations extracted (e.g., via extraction component 108) from a data source and mapped (e.g., via map component 402) to entities of a sensitive data dataset as described above with reference to FIGS. 1 and 5 (e.g., mapped to entities such as, for instance, name, e-mail, addresses, etc. as illustrated in FIG. 8). In some embodiments, such sensitive data policy rules of table 800 can comprise one or more comments 806*a*, 806*b*, 806*n* (where n can represent a total quantity of comments), which can comprise additional actionable obligation instructions and/or information corresponding to roles 802*a*, 802*b*, 802*n* and/or actions 804*a*, 804*b*, 804*n*.

In some embodiments, policy recommendation system 102 can be a sensitive data policy recommendation system and/or process associated with various technologies. For example, policy recommendation system 102 can be associated with machine learning technologies, artificial intelligence technologies, natural language processing (NLP) technologies, information extraction technologies, sensitive data compliance technologies, sensitive data management technologies, computer technologies, server technologies, information technology (IT) technologies, internet-of-things (IoT) technologies, automation technologies, data exchange technologies, or other technologies.

In some embodiments, policy recommendation system 102 can provide technical improvements to systems, devices, components, operational steps, or processing steps associated with the various technologies identified above. For example, policy recommendation system 102 can automatically (e.g., without action by a human user) extract compliance data (e.g., obligations, obligation targets, actionable obligations, etc.) from a data source (e.g., a legal document) and/or recommend a sensitive data policy (e.g., a set of data-specific rule-based constraints corresponding to a sensitive data dataset) based on such compliance data. In this example, such automatic extraction and/or recommendation can thereby eliminate the need of an entity (e.g., a human) to identify and/or track relevant legal documents (e.g., legislation) as well as interpret and/or convert sensitive data obligations of such legal documents into data-specific constraints.

In another example, by facilitating such extraction and/or recommendation operations described above, policy recommendation system 102 can provide technical improvements to traditional information retrieval (IR) systems that fail to identify portions of legal documents containing actionable legislation and fail to map such actionable legislation to certain sensitive data repositories. In this example, such tasks associated with traditional IR systems must be performed manually by large cross-disciplinary teams of lawyers and information technology (IT) experts. In this example, such traditional IR systems also do not provide the ability to track (e.g., compare) relevant regulations over time which requires additional manual efforts, whereas policy recommendation system 102 can facilitate such tracking (e.g., as described above with reference to FIG. 1).

In another example, policy recommendation system 102 can reduce time of translation of actions (e.g., actionable obligations) to actual sensitive data enforcement rules. In another example, policy recommendation system 102 can provide scalability by processing a plurality (e.g., thousands) of sensitive data datasets and attributes to apply actions upon. In another example, policy recommendation system 102 can limit manual authoring (e.g., by a human) of sensitive data rules. In another example, policy recommendation system 102 can enhance auditability of compliance for protection of sensitive data of an individual.

In some embodiments, policy recommendation system 102 can provide technical improvements to a processing unit (e.g., processor 106, a CPU, etc.) associated with one or more of the various technologies identified above. For example, by segmenting a data source into compliance sections from which compliance data can be extracted, policy recommendation system 102 can facilitate improving processing performance of such a processing unit (e.g., processor 106, a CPU etc.) by reducing the amount of data such a processing unit must ingest (e.g., read, write, execute, etc.) in extracting such compliance data.

In some embodiments, policy recommendation system 102 can employ hardware or software to solve problems that are highly technical in nature, that are not abstract and that cannot be performed as a set of mental acts by a human. In some embodiments, some of the processes described herein may be performed by one or more specialized computers (e.g., one or more specialized processing units, a specialized computer with automated component(s), etc.) for carrying out defined tasks related to the various technologies identified above. In some embodiments, policy recommendation system 102 and/or components thereof, can be employed to solve new problems that arise through advancements in technologies mentioned above, employment of cloud-computing systems, computer architecture, and/or another technology.

It is to be appreciated that policy recommendation system 102 can comprise and/or utilize various combinations of electrical components, mechanical components, and/or circuitry that cannot be replicated in the mind of a human or performed by a human, as the various operations that can be executed by policy recommendation system 102 or components thereof as described herein are operations that are greater than the capability of a human mind. For instance, the amount of data processed, the speed of processing such data, or the types of data processed by policy recommendation system 102 over a certain period of time can be greater, faster, or different than the amount, speed, or data type that can be processed by a human mind over the same period of time.

According to several embodiments, policy recommendation system 102 can also be fully operational towards performing one or more other functions (e.g., fully powered on, fully executed, etc.) while also performing the above-referenced sensitive data policy recommendation process. It should be appreciated that such simultaneous multi-operational execution is beyond the capability of a human mind. It should also be appreciated that policy recommendation system 102 can include information that is impossible to obtain manually by an entity, such as a human user. For example, the type, amount, or variety of information included in extraction component 108, recommendation component 110, segmentation component 202, classification component 302, and/or map component 402 can be more complex than information obtained manually by a human user.

Figure 9:
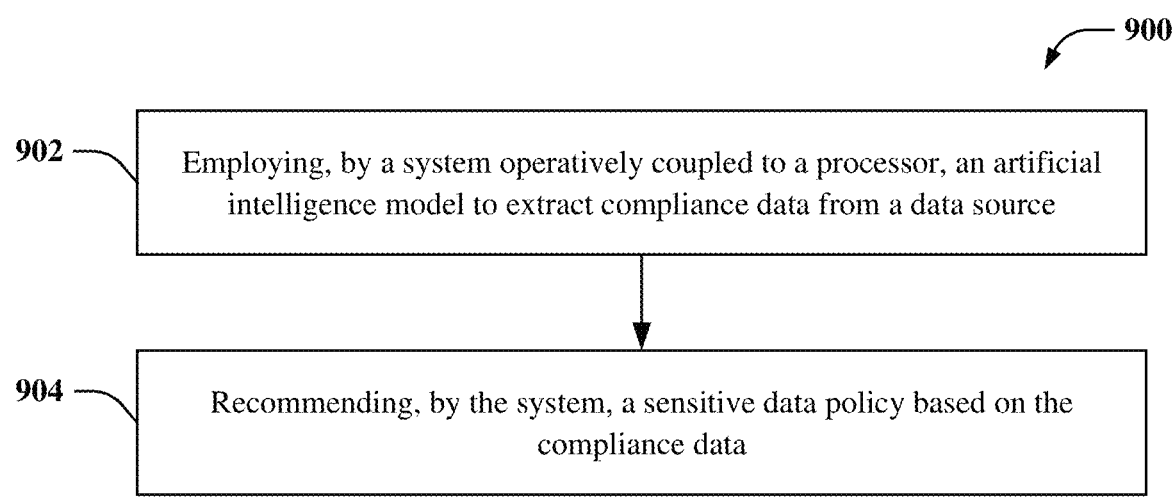
FIG. 9 illustrates a flow diagram of an example, non-limiting computer-implemented method that can facilitate a sensitive data policy recommendation process in accordance with one or more embodiments described herein.

FIG. 9 illustrates a flow diagram of an example, non-limiting computer-implemented method 900 that can facilitate a sensitive data policy recommendation process in accordance with one or more embodiments described herein. Repetitive description of like elements or processes employed in respective embodiments is omitted for sake of brevity.

In some embodiments, at 902, computer-implemented method 900 can comprise employing, by a system (e.g., via policy recommendation system 102 and/or extraction component 108) operatively coupled to a processor (e.g., processor 106), an artificial intelligence model (e.g., LSTM, NLP, etc.) to extract compliance data from a data source. In some embodiments, such compliance data can include, but is not limited to, compliance entity data, obligation data, obligation target data, obligation content data, actionable obligation data, non-actionable obligation data, definition data, definition target data, definition content data, a data property, an entity property, entity relationship data, a role of a data consumer, a data processing technique, and/or other compliance data. In some embodiments, such a data source can include, but is not limited to, a legal document, a legislation document, a guidance document, a regulatory document, a compliance document, a contract, and/or another data source.

In some embodiments, at 904, computer-implemented method 900 can comprise recommending, by the system (e.g., via policy recommendation system 102 and/or recommendation component 110), a sensitive data policy (e.g., a set of rule-based constraints corresponding to a sensitive data dataset) based on the compliance data.

For simplicity of explanation, the computer-implemented methodologies are depicted and described as a series of acts. It is to be understood and appreciated that the subject innovation is not limited by the acts illustrated or by the order of acts, for example acts can occur in various orders or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
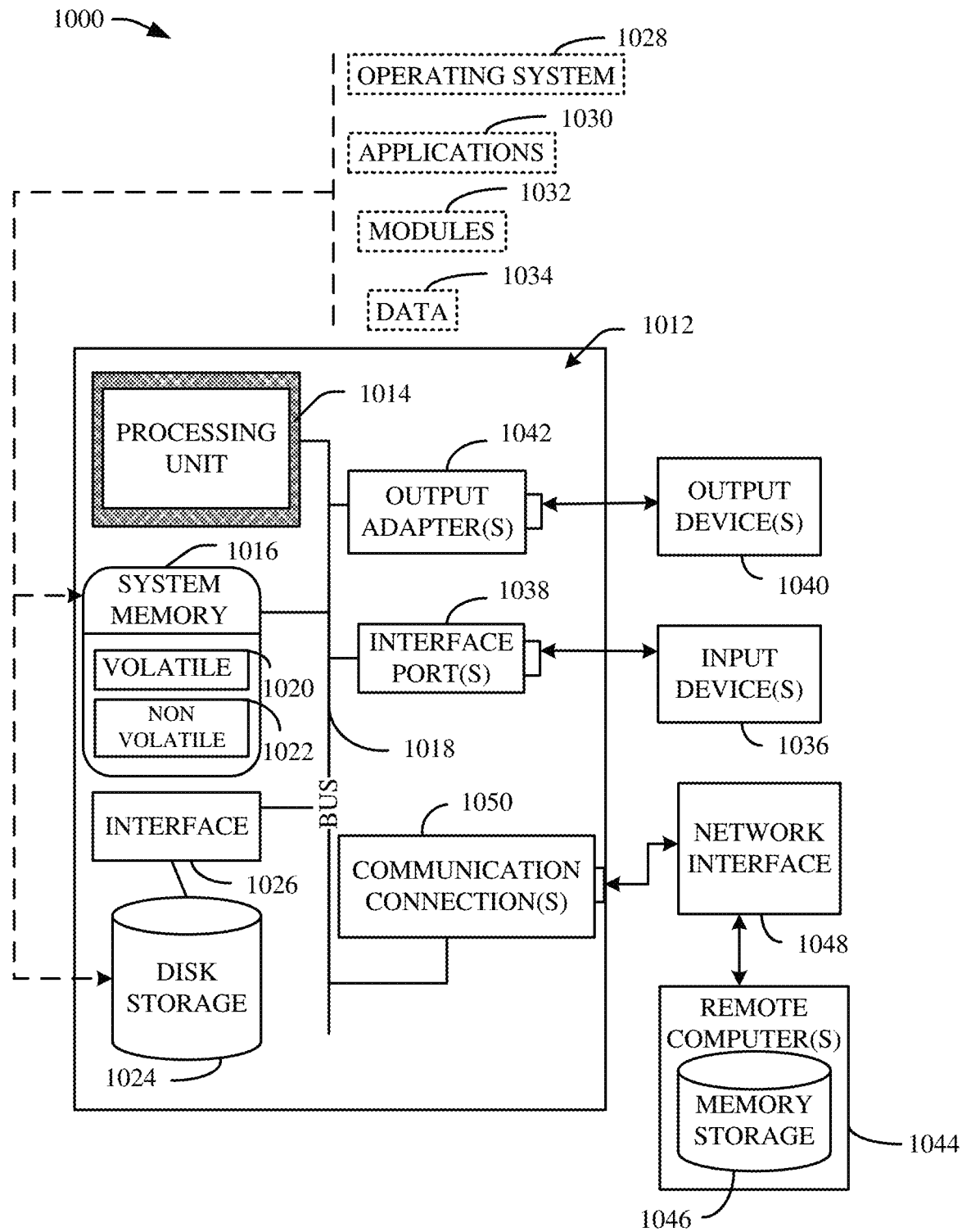
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements or processes employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable instructions stored in the memory to:
      employ an artificial intelligence model to extract compliance data from a data source, wherein the artificial intelligence model performs natural language processing on text of one or more documents in the data source to extract the compliance data related to legal requirements associated with sensitive data datasets, and wherein the compliance data comprises respective actionable obligation data associated with the legal requirements;
      map the respective actionable obligation data in the compliance data to one or more sensitive data entities of a sensitive data dataset, and map the respective actionable obligation data to one or more sensitive data policies for meeting the legal requirements; and recommend a sensitive data policy for a sensitive data entity of the one or more sensitive data entities based on the mappings of the respective actionable obligation data to the one or more sensitive data entities and the one or more sensitive data policies, wherein the sensitive data entity is not currently in compliance with the legal requirements associated with the respective actionable obligation data.

2. The system of claim 1, wherein the compliance data further comprises at least one of compliance entity data, obligation data, obligation target data, obligation content data, non-actionable obligation data, definition data, definition target data, definition content data, a data property, an entity property, entity relationship data, a role of a data consumer, or a data processing technique.

3. The system of claim 1, wherein the processor further executes the computer executable instructions to:
segment the data source into compliance sections comprising at least one of an obligation section or a definition section, thereby facilitating improved processing performance associated with the processor.

4. The system of claim 1, wherein the processor further executes the computer executable instructions to:
classify obligation data of the data source into at least one of actionable obligation data or nonactionable obligation data.

5. The system of claim 1, wherein the processor further executes the computer executable instructions to identify the one or more sensitive data entities that are affected by the respective actionable obligation data.

6. The system of claim 1, wherein the processor further executes the computer executable instructions to employ the artificial intelligence model to extract at least one of new compliance data or revised compliance data from a second data source, and wherein the second data source comprises at least one of an iteration of the data source or a different data source.

7. The system of claim 1, wherein the data source is selected from a group consisting of a legal document, a legislation document, a guidance document, a regulatory document, a compliance document, and a contract.

8. A computer-implemented method, comprising:
employing, by a system operatively coupled to a processor, an artificial intelligence model to extract compliance data from a data source, wherein the artificial intelligence model performs natural language processing on text of one or more documents in the data source to extract the compliance data related to legal requirements associated with sensitive data datasets, and wherein the compliance data comprises respective actionable obligation data associated with the legal requirements;

mapping, by the system, the respective actionable obligation data in the compliance data to one or more sensitive data entities of a sensitive data dataset, and mapping, by the system, the respective actionable obligation data to one or more sensitive data policies for meeting the legal requirements; and recommending, by the system, a sensitive data policy for a sensitive data entity of the one or more sensitive data entities based on the mappings of the respective actionable obligation data to the one or more sensitive data entities and the one or more sensitive data policies, wherein the sensitive data entity is not currently in compliance with the legal requirements associated with the respective actionable obligation data.

9. The computer-implemented method of claim 8, wherein the extracting comprises:
extracting, by the system, from the data source, at least one of compliance entity data, obligation data, obligation target data, obligation content data, non-actionable obligation data, definition data, definition target data, definition content data, a data property, an entity property, entity relationship data, a role of a data consumer, or a data processing technique.

10. The computer-implemented method of claim 8, further comprising:
segmenting, by the system, the data source into compliance sections comprising at least one of an obligation section or a definition section, thereby facilitating improved processing performance associated with the processor.

11. The computer-implemented method of claim 8, further comprising:
classifying, by the system, obligation data of the data source into at least one of actionable obligation data or nonactionable obligation data.

12. The computer-implemented method of claim 8, wherein the data source is selected from a group consisting of a legal document, a legislation document, a guidance document, a regulatory document, a compliance document, and a contract.

13. The computer-implemented method of claim 8, further comprising:
identifying, by the system, the one or more sensitive data entities that are affected by the respective actionable obligation data.

14. A computer program product facilitating a sensitive data policy recommendation process based on compliance data of a data source, the computer program product comprising a computer readable storage medium having program instructions embodied therewith, the program instructions executable by a processor to cause the processor to:
employ, by the processor, an artificial intelligence model to extract the compliance data from the data source, wherein the artificial intelligence model performs natural language processing on text of one or more documents in the data source to extract the compliance data related to legal requirements associated with sensitive data datasets, and wherein the compliance data comprises respective actionable obligation data associated with the legal requirements;

map, by the processor, the respective actionable obligation data in the compliance data to one or more sensitive data entities of a sensitive data dataset, and map, by the processor, the respective actionable obligation data to one or more sensitive data policies for meeting the legal requirements; and recommend, by the processor, a sensitive data policy for a sensitive data entity of the one or more sensitive data entities based on the mappings of the respective actionable obligation data to the one or more sensitive data entities and the one or more sensitive data policies, wherein the sensitive data entity is not currently in compliance with the legal requirements associated with the respective actionable obligation data.

15. The computer program product of claim 14, wherein the program instructions are further executable by the processor to cause the processor to:
extract, by the processor, from the data source, at least one of compliance entity data, obligation data, obligation target data, obligation content data, non-actionable obligation data, definition data, definition target data, definition content data, a data property, an entity property, entity relationship data, a role of a data consumer, or a data processing technique.

16. The computer program product of claim 14, wherein the program instructions are further executable by the processor to cause the processor to:
segment, by the processor, the data source into compliance sections comprising at least one of an obligation section or a definition section.

17. The computer program product of claim 14, wherein the program instructions are further executable by the processor to cause the processor to:
classify, by the processor, obligation data of the data source into at least one of actionable obligation data or nonactionable obligation data.

18. The computer program product of claim 14, wherein the program instructions are further executable by the processor to cause the processor to:

employ, by the processor, the artificial intelligence model to extract at least one of new compliance data or revised compliance data from a second data source, and wherein the second data source comprises at least one of an iteration of the data source or a different data source.

19. The computer program product of claim 14, wherein the program instructions are further executable by the processor to cause the processor to:
identify, by the processor, the one or more sensitive data entities that are affected by the respective actionable obligation data.

20. The computer program product of claim 14, wherein the data source is selected from a group consisting of a legal document, a legislation document, a guidance document, a regulatory document, a compliance document, and a contract.

\* \* \* \* \*